United States Patent Office 2,923,720
Patented Feb. 2, 1960

2,923,720
2-LOWER-ALKYL PREGNENES AND PROCESS THEREFOR

Frank H. Lincoln, Jr., and John A. Hogg, Kalamazoo Township, Kalamazoo County, Mich., assignors to The Upjohn Company, Kalamazoo, Mich., a corporation of Michigan No Drawing. Application January 31, 1955
Serial No. 485,318

20 Claims. (Cl. 260—397.1)

This invention relates to novel steroids, more particularly to synthetic steroid hormones, to novel steroid intermediates in the production of these synthetic steroid hormones and to the process for their production.

The novel compounds of the present invention and the process for their production may be represented by the following formulae:

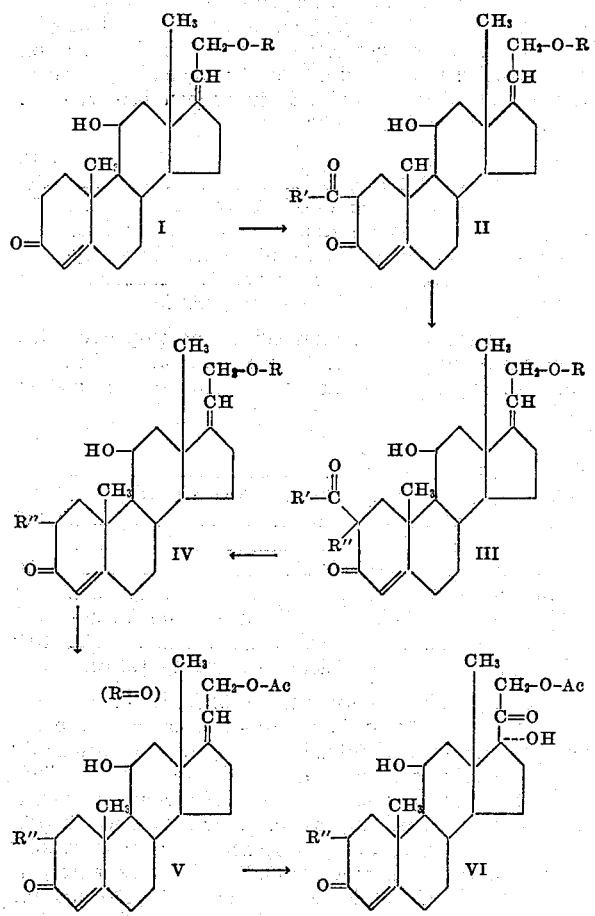

wherein R is hydrogen or the acyl radical of a hydrocarbon carboxylic acid containing from one to twelve carbon atoms, inclusive, R' is hydrogen, lower-alkoxy, trifluoromethyl or carbo-lower-alkoxy, R" is lower-alkyl and Ac is the acyl radical of a hydrocarbon carboxylic acid containing from one to twelve carbon atoms, inclusive.

It is an object of the present invention to provide synthetic steroid hormones. Another object is the provision of steroid intermediates readily convertible to these synthetic steroid hormones. Still another object is the provision of a process for the production of these synthetic steroid hormones. A further object is the provision of a process for the introduction of an alkyl group into the cyclopentanopolyhydrophenanthrene nucleus of $11\beta,21$-dihydroxy-4,17(20) - pregnadiene - 3 - one and 21 - esters thereof. Other objects will be apparent to those skilled in the art to which this invention pertains.

According to the present invention, $11\beta,21$-dihydroxy-4,17(20)-pregnadiene-3-one, or a 21-ester thereof (I) is converted to the novel hormone-like steroids of the present invention by the following reactions: first, glyoxalation, carboxylation, trifluoroacetylation or formylation to produce a 2-carbonyl derivative (II); second, alkylation to produce the corresponding 2-lower-alkyl-2-carbonyl compound (III); third, removal of the 2-carbonyl group to produce the 2-lower-alkyl compound (IV); fourth, esterification of the thus-produced 21-hydroxy compound to produce a 21-esterified compound (V); and fifth, oxidative hydroxylation of the $\Delta^{17(20)}$ double bond to produce a synthetic steroid hormone (VI). Hydrolysis of the 21-ester group, e.g., with aqueous sodium bicarbonate in methanol, is productive of the corresponding 21-hydroxy compound. Each of these reactions will be discussed in detail hereinafter.

The starting $11\beta,21$-dihydroxy-4,17(20)-pregnadiene-3-one is prepared by reacting 11-ketoprogesterone with about a molar equivalent of sodium methoxide and about 2.75 molar equivalents of diethyl oxalate in benzene, brominating the thus produced sodium enolate with about two molar equivalents of bromine and reacting the brominated product with sodium methoxide and methanol to produce methyl 3,11 - diketo - 4,17(20) - pregnadiene-21-oate. Ketalizing the 3-keto group with ethylene glycol followed by reduction with lithium aluminum hydride and subsequent hydrolysis of the thylene glycol ketal group with aqueous acid is productive of $11\beta,21$-dihydroxy-4,17(20)-pregnadiene-3-one. The production of $11\beta,21$-dihydroxy-4,17(20) - pregnadiene - 3 - one and 21-esters thereof is disclosed in U.S. Patent 2,774,776. The 21-esters of $11\beta,21$ - dihydroxy - 4,17(20)-pregnadiene-3-one are prepared by the reaction of the latter compound with the selected esterification agent, e.g., an acid chloride or anhydride in pyridine, an acid in the presence of an esterification catalyst, or an ester under ester exchange reaction conditions. Examples of $11\beta$-hydroxy-21- acyloxy-4,17(20)-pregnadiene-3-ones thus-prepared are described in the examples hereinafter.

Starting with 21 - acetoxy - 4,17(20)-pregnadiene-3,11-dione, the 11-keto analogue of (I), or other 21-esters thereof, which can be prepared by the oxidation of the corresponding 21-ester of $11\beta,21$ - dihydroxy - 4,17(20)-pregnadiene-3-one (I) at the 11-position, and proceeding with the reactions described above, there is thus-produced the corresponding 21-ester of a 2-lower-alkyl-17$\alpha$,21-dihydroxy-4-pregnene-3,11,20-trione. These steroids also possess remarkable cortical hormone activity markedly different from the corresponding esters of 17$\alpha$,21-dihydroxy-4-pregnene-3,11,20-trione. Especially outstanding among these compounds are 2-methyl-17$\alpha$,21-dihydroxy-4-pregnene-3,11,20-trione and the 21-esters thereof wherein the ester group is lower-acyloxy and preferably acetoxy.

The novel 2-lower-alkyl-11$\beta$,17$\alpha$-dihydroxy-21-acyloxy-4-pregnene-3,20-diones of the present invention are converted to other novel hormonal synthetic steroids by the following reactions, exemplified by the use of 2-methyl-$11\beta,17\alpha$ - dihydroxy-21-acetoxy-4-pregnene - 3,20 - dione: Dehydration of 2-methyl-11$\beta$,17$\alpha$-dihydroxy-21-acetoxy-4-pregnene-3,20-dione, for example, by reaction with a dehydrating agent, e.g., paratoluenesulfonic acid, POCl$_5$ in pyridine, HCl in acetic acid, acetic or formic acid in the presence of BF$_3$, is productive of 2-methyl-17$\alpha$-hydroxy-21-acetoxy-4,9(11)-pregnadiene-3,20 - dione which, when reacted with a molar equivalent of N-bromoacetamide in pyridine under aqueous conditions and in the presence of perchloric acid catalyst, is converted to 2-methyl-9α-bromo-11β,17α-dihydroxy-21-acetoxy - 4-pregnene-3,20-dione. Reaction of this latter compound with sodium methoxide in methanol is productive of 2-methyl-9:11-β-oxido-11β,17α - dihydroxy - 21 - acetoxy - 4 - pregnene-3,20-dione. Addition of hydrogen fluoride to this compound, for example, with a methylene chloride solution of a molar equivalent of hydrogen fluoride at minus fifteen degrees centigrade, is productive of 2-methyl-9α-fluoro-11β,17α-dihydroxy-21-acetoxy - 4 - pregnene - 3,20-dione. Substitution of hydrogen chloride for the hydrogen fluoride at about zero degrees centigrade is productive of 2-methyl-9α-chloro-11β,17α-dihydroxy-21-acetoxy-4-pregnene-3,20-dione. These latter two compounds, and especially the 9α-fluoro compound, possesses remarkable hormonal properties. Their activity spectrum, e.g., mineralocorticoid, glucocorticoid and anti-inflammatory activity is of a different order and kind from any of the natural or known synthetic adrenal cortical hormones. Their anti-inflammatory activity is of an especially high order of activity.

Substitution of another 2 - lower - alkyl-11β,17α-dihydroxy-21-acyloxy-4-pregnene-3,20-dione as the starting steroid in the reactions described above is productive of the corresponding 2-lower-alkyl-9α-chloro or fluoro-11β,17α-dihydroxy-21-acyloxy-4-pregnene-3,20-dione.

The novel 2 - lower - alkyl - 11β,17α,21 - trihydroxy-4-pregnene-3,20-dione and 21-esters thereof have a high order of physiological activity, and possess an entirely different activity spectrum than the adrenal cortical hormone hydrocortisone. The novel cortical synthetic steroid hormones of the present invention possess anti-inflammatory, glucocorticoid, and mineralocorticoid activity of a high order. Their surprising pattern of physiological activity is exemplified by the discovery that 2-methyl-11β,17α-dihydroxy-21-acetoxy-4-pregnene-3,20-dione has both mineralocorticoid and anti-inflammatory activity of a very high order whereas desoxycorticosterone and its acetate has little or no anti-inflammatory activity, but has pronounced mineralocorticoid activity and hydrocortisone and its acetate has marked anti-inflammatory activity but a very low order of mineralocorticoid activity. For example, the 2-methyl synthetic cortical hormone of the present invention has an anti-inflammatory activity about seven times as great as hydrocortisone by the cotton wad test and a mineralocorticoid activity significantly greater than hydrocortsone acetate. The 2-methyl compound of the present invention is about four times as active orally as hydrocortisone acetate in causing adrenal, splenic and thymic involution in test animals but contrary to desoxycorticosterone acetate, caused no renal hypertrophy. The compound of the present invention is about seven times as active as hydrocortisone in the work test for glucocorticoid activity and has marked glucocorticoid activity by the glycogen deposition assay.

The novel compounds of the present invention (VI), especially the 2-methyl compounds are useful in the treatment of maladies in both humans and valuable domestic animals, e.g., inflammations of the skin and eyes, caused by bacterial or fungal infections, contact dermititis or physiological maladjustment.

The novel 2 - lower - alkyl-11β,17α,21-trihydroxy-4-pregnene - 3,20 - dione and 2-lower-alkyl-11β,17α-dihydroxy-21-acyloxy-4-pregnene-3,20-diones of the present invention are especially useful as pharmaceutical compositions and mixtures, e.g., ointments, lotions, greases, creams, aqueous suspensions, etc., for topical use. Examples of especially advantageous pharmaceutical compositions are listed below. Although the examples are to the 2-methyl-11β,17α,21-trihydroxy-4-pregnene-3,20-dione and 2 - methyl - 11β,17α-dihydroxy-21-acetoxy-4-pregnene-3,20-dione, it is to be understood that the other 2-lower-alkyl homologues of the present invention and 21-esters thereof, respectively, are substitutable therein.

The novel 2-methyl-11β,17α-dihydroxy-21-acetoxy-4-pregnene-3,20-dione is advantageously employed as a topical ointment for use on the skin or in the eyes in the treatment of topical inflammatory conditions. A suitable topical and ophthalmic ointment has the following composition:

|  | Lbs. |
|---|---|
| 20 percent wool fat, U.S.P. | 100 |
| 25 percent white mineral oil, U.S.P. | 125 |
| 0.5 percent 2 - methyl - 11β,17α-dihydroxy-21-acetoxy-4-pregnene-3,20-dione (micronized) | 2.5 |
| White petrolatum, U.S.P., q.s. ad 500 lbs. | |

The wool fat and petrolatum are melted and strained into a suitable container. The temperature is adjusted to 113 degrees Fahrenheit. The steroid is mixed with ninety pounds of strained mineral oil and milled through a Fitzpatrick mill. The mill is washed with 35 pounds of strained mineral oil. The steroid mixture and mill washings are added to the base and the base then stirred with a high speed mixer until congealed.

Incorporation of an antibiotic in the ointment, especially neomycin sulfate, has surprising therapeutic advantages each active ingredient potentiating and supplementing the useful properties of the other in a fashion more particularly described in the copending application of Dale, Ser. No. 458,679, filed September 27, 1954. Such an ointment is as follows:

|  | Lbs. |
|---|---|
| 20 percent wool fat, U.S.P. | 100 |
| 25 percent white mineral oil, U.S.P. | 125 |
| 0.6 percent neomycin sulfate (microatomized) | 3 |
| 1.0 percent 2-methyl-11β,17α-dihydroxy-21-acetoxy-4-pregnene-3,20-dione (micronized) | 5 |
| White petrolatum, U.S.P., q.s. ad 500 lbs. | |

An injectable composition suited for suspending the compounds of the present invention, which has advantages in the treatment of Addisonian crisis and in shock is as follows:

|  | Mg. |
|---|---|
| Sodium citrate, U.S.P. | 5.7 |
| Sodium carboxymethylcellulose, low viscosity | 2.0 |
| Plasdone (polyvinylpyrrolidone) | 10.0 |
| Polysorbate 80, U.S.P. | 4.0 |
| Sterile methylparaben, U.S.P. | 1.5 |
| Sterile propylparaben, U.S.P. | 0.2 |
| 2-methyl-11β,17α-dihydroxy-21-acetoxy-4-pregnene-3,20-dione | 10.0 |
| Water for injection, sufficient to make up 1.0 cc. | |

The suspending agents in this vehicle, in this case the combination of polyvinylpyrrolidone-sodium carboxymethylcellulose or a polyalkylene glycol are particularly useful when used in conjunction with the novel 2-alkylated physiologically active steroids of the present invention, make an especially useful combination which produces stable suspensions or suspensions which are readily resuspendible which prevents undue caking as more particularly pointed out in U.S. Patent 2,897,120 and the copending application of Sponnable and Hamlin, Ser. No. 471,512, filed November 26, 1954.

Another composition suitable for injection has the following composition:

2.5 grams sterile micronized 2-methyl-11β,17α,21-trihydroxy-4-pregnene-3,20-dione
3.0 grams Polyethylene Glycol 4000
0.9 gram sodium chloride gran., U.S.P.
0.4 gram Tween 80
1.5 grams benzyl alcohol, N.F.
Q.s. 100 cc. water for injection The polyethylene glycol, sodium chloride, Tween 80 and benzyl alcohol are dissolved in water and the solution sterilized by filtration. Sterile 2-methyl-11β,17α,21-trihydroxy-4-pregnene-3,20-dione is then aseptically mixed with the sterile vehicle and the whole homogenized.

11β,21-dihydroxy-4,17(20)-pregnadiene-3-one or a 21-ester thereof is converted to a 2-lower-alkyl-11β,17α,21-trihydroxy-4-pregnene 3,20-dione or 21-ester thereof by reactions described in detail hereinafter.

CONDENSATION

In carrying out the condensation, 11β,21-dihydroxy-4,17(20)-pregnadiene-3-one or 21-ester thereof is admixed with the selected alkali-metal condensation catalyst and dialkyl ester of oxalic acid, or carbonic acid or alkyl ester of trifluoroacetic or formic acid in an organic solvent therefor, the order of mixing being non-critical, to produce the alkali-metal salt of a compound represented by Formula II wherein R is hydrogen or the acyl radical of a carboxylic acid and R' is hydrogen, lower-alkoxy, trifluoromethyl or carbo-lower-alkoxy, i.e., the 2-carbonyl group is formyl, —COO-lower-alkyl, $CF_3CO$— or —COCOO-lower-alkyl, respectively. The free enol is conveniently prepared by the neutralization of an aqueous solution of an alkali-metal enolate thereof, thus precipitating the free enol. Preferred starting steroids are those represented by Formula I wherein R is the acyl radical of a hydrocarbon carboxylic acid containing from one to twelve carbon atoms, inclusive, especially aliphatic acids containing from one to eight carbon atoms, inclusive, preferably acetic.

Reaction solvents which can conveniently be employed in the condensation include benzene, toluene, xylene, and like aromatic hydrocarbons, methanol, ethanol, isopropyl alcohol, tertiary butyl alcohol, and other alcohols, tetrahydrofuran, dioxane, diethyl ether, Skellysolve B hexane hydrocarbons and other aliphatic hydrocarbons, mixtures of these solvents, and other essentially non-reactive solvents. Benzene, with or without small percentages of added alkanol, or tertiary butyl alcohol are usually the preferred solvents.

The condensation is usually conducted at a temperature between about zero degrees centigrade and the boiling point of the reaction mixture. Usually the reaction proceeds with satisfactory rapidity at between about room temperature and about seventy degrees centigrade, and temperatures substantially above or below this range are therefore usually not employed. However, when other than the methyl or ethyl ester of formic, carbonic or oxalic acid or when bases weaker than sodium methoxide or ethoxide are employed, temperatures substantially higher than the preferred range may be required to obtain a satisfactory yield of carbonyl substituted product.

The time necessary to obtain substantially complete reaction varies considerably between about five minutes and several days, depending upon the reaction solvent, the reaction temperature, the selected ester of formic, carbonic, $CF_3COOH$ or oxalic acid, and the alkali-metal condensation catalyst employed, the moisture present in the reaction, and the molar ratios of the reactants. When sodium methoxide, methyl or ethyl formate, carbonate or oxalate and tertiary butyl alcohol are employed at about fifty degrees centigrade, the reaction is usually more than half completed in a few minutes.

The condensation step is usually carried out in the absence of any significant amounts of water in any form in the reaction, as would be expected in a reaction of this type. To ensure the essentially complete exclusion of water from the reaction mixture, the solvent is usually carefully dried with a drying agent such as, for example, anhydrous sodium sulfate, calcium sulfate, calcium chloride, phosphorous pentoxide, sodium, or the like, or when an aromatic hydrocarbon is used as the solvent, a portion of the solvent is distilled before using.

Since the reaction is somewhat reversible, i.e., the reaction product in the presence of a large amount of an alkanol such as methanol or ethanol and a catalytic amount of base may undergo alcoholysis to give starting material, the presence of a large amount of methanol or ethanol in the reaction mixture is usually not desirable although satisfactory amounts of product have been obtained using ethanol as the sole reaction solvent.

Alkali-metal condensation catalysts includes the alkali-metal alkoxides, e.g., sodium methoxide, sodium ethoxide, sodium isopropoxide, potassium tertiary butoxide, lithium methoxide, and the like, the alkali metals, the alkali-metal hydrides, alkali-metal amides and alkyl alkali metals, e.g., sodium amide, triphenyl methyl sodium, and the like. Of these, the alkali-metal alkoxides, especially sodium methoxide and sodium ethoxide, are preferred for their convenience and consistently satisfactory results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedure well known in the art.

The theoretical alkali-metal condensation catalyst required is one mole per mole of steroid. Somewhat more than the theoretical amount is usually employed, however.

The presence of substantially greater than one molar equivalent of alkyl ester formic, carbonic, trifluoroacetic or of oxalic acid, per mole of starting steroid, is also advantageous and promotes rapid completion of the reaction. The reaction is therefore usually carried out in the presence of greater than about one molar equivalent of the selected ester. Esters, preferably of oxalic acid, which are conveniently employed in the process of the present invention include the lower-alkyl esters, e.g., methyl, ethyl, and the propyl, butyl, isobutyl, amyl, hexyl, heptyl, and octyl esters of formic, carbonic or oxalic acid, and the like. Since the methyl and ethyl esters appear to undergo condensation with the starting steroid the most rapidly, these esters are usually employed with methyl oxalate and ethyl oxalate being especially preferred.

The thus produced alkali-metal enolate may be separated by the addition of a large volume of an organic solvent in which the alkali-metal enolate is insoluble, such as ether, pentane, or benzene, for example. Another method of producing a somewhat purer alkali-metal enolate comprises acidification of a cold aqueous solution of the thus precipitated alkali-metal enolate to precipitate the free enol and then treating a solution of the free enol in ether or benzene with a chemical equivalent of sodium methoxide, thus reprecipitating the sodium enolate. When the condensation is carried out in the presence of substantial amounts of methyl or ethyl alcohol, the removal of said alcohol by distillation at reduced pressure before the addition of an additional amount of solvent is preferred, if a high yield of isolated product is to be obtained.

ALKYLATION

The alkylation involves the alkylation of the alkali-metal salt of a 2-carbonyl-11β-hydroxy-21-oxy-4,17(20)-pregnadiene-3-one represented by Formula II with a lower-alkyl halide wherein the halogen has an atomic weight from 79 to 127, inclusive, i.e., the lower-alkyl group contains from one to eight carbon atoms, inclusive, and the halogen is bromine or iodine, to produce a 2-carbonyl-2-lower-alkyl-11β-hydroxy-21-oxy-4,17(20)-pregnadiene represented by Formula III.

The alkali-metal salt of a compound represented by Formula II may be in the form of the pure isolated alkali-metal salt of the product of the condensation reaction (II), e.g., potassium, lithium or sodium salt, or in the form of a solution of the free active-methylene compound (II) mixed with an alkali-metal alkylation catalyst, e.g., the alkali-metal alkoxides, preferably containing from one to eight carbon atoms, inclusive, e.g., sodium methoxide, sodium ethoxide, lithium methoxide, potassium tertiary butoxide, etc., the alkali-metals, the alkali-metal hydrides, the alkali-metal amides, triphenylmethyl sodium, the alkali-metal carbonates, e.g., sodium or potassium carbonate, etc., i.e., a base capable of forming a salt with an active methylene compound, in solution or suspension. The presence of a molar excess of alkylation catalyst appears to be sometimes advantageous if the catalyst is relatively weak, e.g., an alkali-metal carbonate.

The usual reaction conditions and solvents employed in the alkylation of an active methylene compound are employed in the alkylation process. The reaction is usually continued for several hours, e.g., about eight to about 72, at a reaction temperature of about room temperature although higher reaction temperatures shorten this reaction time considerably.

A convenient method of alkylation involves the addition of the selected alkyl halide to the reaction product resulting from the condensation step, preferably after the decomposition of any excess alkali-metal condensation catalyst.

Satisfactory yields are also obtained by stirring a solution of the free active methylene compound (II) with the selected alkyl halide in the presence of the selected alkali-metal alkylation catalyst.

The alkylation product is a 2-lower-alkyl-2-carbonyl-11$\beta$-hydroxy-21-oxy-4,17(20)-pregnadiene-3-one (III) wherein the carbonyl group is that of the starting carbonyl compound (II), i.e., R' is hydrogen, lower-alkoxy, trifluoromethyl or carbo-lower-alkoxy and the 21-oxy group is hydroxy if the starting steroid possessed a 21-hydroxy group or 21-acyloxy if the starting steroid possessed that group. Ordinarily, there is insufficient methyl or ethyl alcohol in the alkylation mixture to produce significant alcoholysis of a 21-acyloxy group during the alkylation and a 21-acyloxy group, if present in the starting steroid (II), is ordinarily unaffected in the alkylation reaction.

REVERSAL

The reversal step of the present invention involves the removal of the carbonyl, i.e., formyl, carboalkoxy, trifluoroacetyl or alkoxyoxalyl, group from the 2-position leaving the alkyl group, at the 2-position thus producing a 2-lower-alkyl-11$\beta$-hydroxy-21-oxy-4,17(20)-pregnadiene-3-one represented by Formula IV. The reversal of an acetoacetic ester condensation in disubstituted acetoacetic ester is a recognized phenomenon. See "Organic Reactions," Wiley publishers, vol. I, 269 (1942), where alcoholic sodium ethoxide was found to produce the reversal phenomenon.

The reversal step of the present invention is produced by the alkali-metal alkylation catalysts, in the presence of water or a lower-alkanol, i.e., the reversal is promoted by the presence of hydroxide or alkoxide ions, particularly methoxide and ethoxide ions. Thus there is produced a 2-lower-alkyl-11$\beta$-hydroxy-21-oxy-4,17(20)-pregnadiene-3-one of the present invention (IV).

Ordinarily, the 21-oxy group of the compound produced in the reversal is a hydroxy group (IV, R=H) since the conditions which promote the reversal of the 2-carbonyl group also promote the alcoholysis of any 2-acyloxy group to produce a 21-hydroxy. If the starting steroid for the condensation and/or alkylation step is a 21-hydroxy group, then the reaction product of the reversal step will also be a 21-hydroxy group. The more hindered 21-acyloxy groups, e.g., trimethylacetoxy, 2,6-disubstitutedbenzoxy, etc., will remain substantially intact during the reversal reaction whereas the unhindered groups, e.g., formoyloxy, acetoxy, and other $\alpha$-unsubstituted hydrocarbon acids, etc., are almost completely converted to hydroxy groups. The degree of alcoholysis or hydrolysis of the partially hindered 21-acyloxy groups will depend, in part, upon the reaction temperature and time and reactants promoting the reversal.

ESTERIFICATION

The reaction product resulting from the reversal reaction will contain at least some 2-lower-alkyl-11$\beta$,21-dihydroxy-4,17(20)-pregnadiene-3-one and frequently free 21-hydroxy steroid will be the sole reaction product, particularly if the starting steroid (I and/or II) is a 21-hydroxy compound.

It is preferred in the oxidative hydroxylation of the reaction product of the reversal reaction that all the starting steroid for the oxidative hydroxylation be 21-acyloxy steroid (V). The reaction product (IV) is therefore reacted with an esterification agent.

The esterification step of the process of the present invention involves the conversion of the 21-hydroxy group of a 2-lower-alkyl-11$\beta$,21-dihydroxy-4,17(20)-pregnadiene-3-one (IV) to a 21-ester group (V). This can be performed under the esterification conditions known in the art, e.g., by the reaction of IV with the selected acid anhydride or acid chloride, preferably in the presence of pyridine, alkylpyridine or other N-cycloaromatic tertiary amine; with the free acid, e.g., formic acid or a weaker acid in the presence of an esterification catalyst, e.g., para-toluenesulfonic acid or sulfuric acid; with an ester by ester interchange reaction; or by reaction with the ketene of the selected acid.

Since the 11$\beta$-hydroxy group is relatively labile, reaction conditions which are not apt to cause dehydration, or alteration in some other manner, of the 11$\beta$-hydroxy group are preferred. The preferred esterification reagent is an acetylating agent, e.g., acetic anhydride, preferably in the presence of pyridine, producing a compound represented by Formula V wherein Ac is acetyl.

OXIDATIVE HYDROXYLATION

The oxidative hydroxylation step of the present invention consists of the reaction of a 2-lower-alkyl-11$\beta$-hydroxy-21-acyloxy-4,17(20)-pregnadiene-3-one (V) with a hydroxylating agent and an oxidizing agent to produce a 2-lower-alkyl-11$\beta$,17$\alpha$-dihydroxy-21-acyloxy-4-pregnene-3,20-dione (VI).

The hydroxylation of a $\Delta^{17(20)}$-21-acyloxy steroid to produce a 17$\alpha$,20-dihydroxy steroid is a well known reaction. See, for example, Ruzicka and Mueller, Helv. Chim. Acta, 22, 57 (1939), and U.S. Patent 2,492,194. In this reaction, a metal oxide is ordinarily employed to add to the double bond to produce, upon hydrolysis, a glycol. Osmium tetroxide is ordinarily the metal oxide of choice. For a discussion of the hydroxylating abilities of the metal oxides, preferably from sub-groups IV, V and VI of the periodic table, see Milas, J. Am. Chem. Soc., 59, 2342 (1937), and Mugden and Young, J. Chem. Soc., 1944, 2988. Examples of other hydroxylating metal oxides or derivatives thereof include manganese dioxide, vanadium pentoxide, chromium trioxide, pertungstic acid, permolybdic acid, selenium dioxide, etc.

The first recognized example of an oxidative hydroxylation of a steroid is found in Prins and Reichstein, Helv. Chim. Acta, 25, 300 (1942). There is reported, using osmium tetroxide and chloric acid, the oxidative hydroxylation of a $\Delta^{20(21)}$ steroid to produce a 20-keto-21-hydroxy steroid. The concept of oxidative hydroxylation outside the field of steroidal chemistry was first demonstrated, employing a catalytic amount of osmium tetroxide with hydrogen peroxide, by Criegee, Annalen der Chemie, 522, 75 (1936)

Oxidizing agents which may be employed in the oxidative hydroxylation step of the present invention are the oxidizing agents which contribute an oxygen atom to the reaction and include, hydrogen peroxide, alkyl peroxides, peracids, chloric acid, periodic acid, acetyl peroxide, benzoyl peroxide, tertiary amine oxide peroxides, aryliodo oxides, lead tetraacetate, manganese dioxide, mercury diacetate, etc., i.e., oxygen donating oxidizing agents.

The use of osmium tetroxide and hydrogen peroxide in the oxidative hydroxylation of certain $\Delta^{17(20)}$-21-substituted steroids is claimed in U.S. Patents 2,662,854 and 2,668,816. The use of amine oxide peroxides with osmium tetroxide in the oxidative hydroxylation of $\Delta^{17(20)}$-21-acyloxy steroids is claimed in U.S. Patent 2,769,824 and the use of aryliodo oxides with osmium tetroxide in the oxidative hydroxylation of these same steroids is claimed in U.S. Patent 2,875,217. The use of hydrogen peroxide, an amine oxide peroxide or an aryliodo oxide as the oxidizing agent in the oxidative hydroxylation of the present invention is preferred. The use of these reagents is discussed more fully below.

The amide oxide peroxides which may be employed in the oxidative hydroxylation step of this invention are prepared by the reaction of some tertiary amines with two molar equivalents of hydrogen peroxide or by the reaction of a tertiary amine oxide with one molar equivalent of hydrogen peroxide. Amine oxide peroxides are a novel class of oxidizing agents. For the most part, they have a higher oxidation potential than the hydrogen peroxide from which they were prepared.

The amine oxide peroxides of the present invention are preferably non-aromatic, i.e., the molecule is devoid of an aromatic group of any kind. The non-aromatic tertiary amine oxide peroxides include the N-alkycycloalkylamines oxide peroxides, e.g., N-alkylmorpholine oxide peroxide, N-alkylpyrrolidine oxide peroxides, and N-alkylpiperidine oxide peroxides, the trialkylamine oxide peroxides, e.g., trimethylamine oxide peroxide, triethylamine oxide peroxide, methyldiethylamine oxide peroxide, ethyldimethylamine oxide peroxides, the alkanolamine oxide peroxides, e.g., dimethylethanolamine oxide peroxide, pyrrolidylethanol oxide peroxide, piperidylethanol oxide peroxide, etc. Of these amine oxide peroxides, triethylamine oxide peroxide and N-methylmorpholine oxide peroxide are especially advantageous.

The organic polyvalent iodo oxides which may be employed in the oxidative hydroxylation step of this invention are organic iodo compounds having at least one titratable oxygen atom attached to the iodine atoms. The presence of a titratable iodo oxide oxygen atom can be determined in the usual manner with KI, acid and sodium thiosulfate. The known examples of these iodo oxides are iodoso, iodyl and iodoxy compounds and salts thereof. The iodonium compounds are not included in the term "iodo oxides" as used herein since the hydroxy group of the iodonium compounds is ionic in nature and is not therefore directly attached to the iodine atom, but merely associated with it ionically. The iodoso compounds have one oxygen atom attached to the iodine atom; the iodoxy compounds have two oxygen atoms attached.

An excellent reference to these iodo oxides is Willgerodt, "Die Organischem Verbindungen Mit Mehrwertigem Jod," F. Enke, Stuttgart (1914). Many iodo oxides are disclosed in this reference. Other references include R. Sandin, "Organic Compounds of Polyvalent Iodine," Chem. Rev., 32, 249 (1943); Sidgwick, "Chemical Elements and Their Compounds," vol. II, 1243–1260, Oxford Univ. Press (1950); and Mason et al., J. Chem. Soc., 1935, 1669. The latter reference discloses the iodyl compounds.

From these references, it appears that iodo oxides can be prepared from aryl iodo compounds or other vinyl iodides whose double bond is also modified in some way, e.g., by halogenation, as in α-chloro-iodoethylene, chloroiodofumaric acid or α-chloro-iodoacrylic acid.

Examples of the known aryl iodo oxides include iodosobenzene, phenyliodosoacetate, diphenyliodyl hydroxide and acetate, phenyliodosopropionate, iodoxybenzene, the ring alkylated iodoso and iodoxybenzenes, and the oxides of iodonaphthylene, iodobenzoquinone and iodoanthroquinone, iodobenzoic acid, iodobenzenesulfonic acid, iodobenzaldehyde, iodobenzophenone, iodosalicylic acid, etc. The heterocyclic aryl iodo oxides, e.g., of the pyridine, thiophene and furan series, do not appear to be known, but are included in the term "aryl iodo oxide."

The preferred organic polyvalent iodo oxides employed in the process of the present invention are the carbocyclic aryl iodo oxides. Of these the aryl iodoso compounds are preferred, e.g., iodosobenzene and phenyliodosoacetate, which have been found to give especially good results. The iodoxy compounds, for the most part, are very insoluble in organic solvents, and therefore do not usually give as satisfactory results as the corresponding iodoso compounds with respect to reaction rate and/or yield of 17-hydroxy-20-keto product.

The preferred aryl iodoso compounds are ordinarily prepared by the reaction of any aryl iododichloride with a base, e.g., sodium hydroxide. The aryl iodoso acid salts can be prepared by the reaction of an aryl iodide with the selected organic peracid. The iodoxy compounds are prepared by boiling the corresponding iodoso compounds in water or by oxidizing an aryl iodide with, for example, Caro's acid. The iodyl hydroxides are prepared by the reaction of an aryl iodoxy compound with two molar equivalents of sodium hydroxide in a one normal aqueous solution of sodium hydroxide at zero degrees centigrade for about 1.5 hours. See Mason (loc. cit.). The salts of aryl iodyl hydroxy compounds are prepared by precipitating the aryl iodyl hydroxide as the carbonate and reacting the carbonate with the selected acid.

In carrying out the oxidative hydroxylation step of the invention, the starting steroid is advantageously dissolved in an inert organic solvent, for example, tertiary butyl alcohol, diethyl ether, tetrahydrofuran, or the like, and the hydroxylating agent preferably osmium tetroxide and the oxidizing agent mixed therein. Advantageously, though not necessarily, the hydroxylating agent is added after the addition of the oxidizing agent. Advantageously also, the osmium tetroxide and the oxidizing agent peroxide are added in solutions of the same solvent used as the vehicle used for the reaction.

The amount of the preferred osmium tetroxide hydroxylating agent employed in the reaction can be varied widely, for example, from about 0.2 molar equivalent to 0.001 molar equivalent. Advantageously, however, not more than 0.05 molar equivalent is used.

The amount of oxidizing agent theoretically required to produce a 17-hydroxy-20-keto-21-acyloxy steroid is two oxidizing equivalents for each mole of osmate ester formed in the reaction. It has been found, however, that in the process of this invention, more than the theoretical amount of oxidizing agent is ordinarily necessary to obtain a complete reaction. For optimum results in the process of this invention, therefore, it is usually necessary to use the oxidizing agent in excess of the theoretical amount. For example, optimum results or ordinarily obtained using between about 2.2 and about 2.75 equivalents of amine oxide peroxide or aryl iodo oxide, calculated on the starting steroid. The course are ordinarily obtained using between about 2.2 and determined by the titration of aliquot portions for residual oxidizing agent. Ordinarily, the presence of small amounts of water in the reaction mixture does not adversely affect the yield of desired product. However, to ensure optimum yields of desired product when employing hydrogen peroxide or an amine oxide peroxide, the reaction advantageously may be performed under substantially anhydrous conditions, e.g., in dry tertiary butyl alcohol, or like solvent.

The reaction temperature for the oxidative hydroxylation step normally is between about fifteen and about thirty degrees centigrade although higher or lower temperatures are operable, e.g., between about minus ten and about plus seventy degrees centigrade. In place of the solvents noted above, there may be used any inert solvent which is a solvent for the reagents. Suitable solvents include diethylether, dioxane, isopropylalcohol, tetrahydrofuran, tertiary butyl alcohol, tertiary amyl alcohol, ethanol and methanol.

The following examples are illustrative of the process and products of the present invention, but are not to be construed as limiting.

EXAMPLE 1

*2-glyoxalation of 11β-hydroxy-21-acetoxy-4,17(20)-pregnadiene-3-one*

A solution of 18.62 grams (0.05 mole) of 11β-hydroxy-21-acetoxy-4,17(20)-pregnadiene-3-one was prepared in 300 milliliters of dry tertiary butyl alcohol by heating the mixture at seventy degrees centigrade. The solution was cooled to 55 degrees centigrade and to the stirred solution, protected from atmospheric oxgen by bubbling nitrogen therethrough, was added 11.5 grams (0.10 mole) of methyl oxalate followed by a solution of 4.05 grams (0.075 mole) of sodium methoxide dissolved in sixteen milliliters of methanol. A thick, pale yellow precipitate soon appeared. Stirring was continued for ten minutes and the mixture was then diluted with 300 milliliters of anhydrous ether. Stirring was continued for an additional fifteen minutes and the mixture then filtered. The pale yellow-green precipitate was washed and dried at room temperature in a vacuum. The yield of about 24 grams of precipitate consisted primarily of a sodium enolate of 2-methoxy-oxalyl-11β-hydroxy-21-acetoxy-4,17(20)-pregnadiene-3-one.

The precipitate was dissolved in 250 milliliters of water and the solution acidified with dilute hydrochloric acid. The resulting precipitate was collected by filtration, washed with water and dried. There was thus obtained 18.71 grams of an amorphous powder consisting essentially of 2-methoxyoxalyl-11β-hydroxy-21-acetoxy-4,17-(20)-pregnadiene-3-one which melted at eighty to 95 degrees centigrade and which gave a positive red-brown ferric chloride test.

EXAMPLE 2

*2-glyoxalation of 11β-hydroxy-21-acetoxy-4,17(20)-pregnadiene-3-one*

Following the procedure described in Example 1, 2-ethoxy-oxalyl-11β-hydroxy-21-acetoxy-4,17(20)-pregnadiene-3-one and its sodium enolate is produced by the reaction of 11β-hydroxy-21-acetoxy-4,17(20)-pregnadiene-3-one with diethyl oxalate and sodium ethoxide.

Following the procedure described in Example 1, other 21-esters of 2-methoxyoxalyl-11β,21-dihydroxy-4,17(20)-pregnadiene-3-one are prepared by substituting the corresponding 21-ester of 11β,21-dihydroxy-4,17(20)-pregnadiene-3-one as the starting steroid of the reaction described in Example 1. Examples of 2-methoxyoxalyl-11β-hydroxy-21-acyloxy-4,17(20)-pregnadiene-3-ones thus prepared include those wherein the acyl group is the acyl radical of a hydrocarbon carboxylic acid containing from one to twelve carbon atoms, inclusive, preferably a lower-aliphatic acid containing from one to eight carbon atoms, inclusive, e.g., formic, propionic, butyric, isobutyric, valeric, isovaleric, trimethylacetic, hexanoic, diethylacetic, triethylacetic, octanoic, or other aryl, alkaryl, aralkyl or cycloalkyl, acids, e.g., benzoic, naphthoic, phenylacetic, 2,4,6-triethylbenzoic, cyclopentylformic.

Similarly, other 2-alkoxyoxalyl-11β-hydroxy-21-acyloxy-4,17(20)-pregnadiene-3-ones are prepared by the reaction of 11β,21-dihydroxy-4,17(20)-pregnadiene-3-one or selected 21-ester thereof with a di-lower-alkyl ester of oxalic acid, e.g., dipropyl oxalate, methyl propyl oxalate, methyl butyl oxalate, methyl amyl oxalate, methyl hexyl oxalate, methyl heptyl oxalate, methyl octyl oxalate, etc.

EXAMPLE 3

*2-formylation of 11β-hydroxy-21-acetoxy-4,17(20)-pregnadiene-3-one*

A mixture of 150 milliliters of dry benzene and a solution of 8.10 grams (0.015 mole) of sodium methoxide in 33 milliliters of methanol was distilled in a nitrogen atmosphere until sixty milliliters of distillate was collected. The remaining suspension of sodium methoxide in benzene was cooled to fifty degrees centigrade and 18.5 grams (0.25 mole) of ethyl formate was then added. After stirring the mixture for fifteen minutes, a solution of 3-keto-11β-hydroxy-21-acetoxy-4,17(20)-pregnadiene-3-one in 300 milliliters of dry benzene at fifty degrees centigrade was rapidly added thereto. The temperature of the mixture was gradually reduced to about 25 degrees centigrade while stirring was continued for one hour. There was then added 250 milliliters of anhydrous ether followed by further stirring for an additional hour whereafter another 250 milliliter portion of ether was added and the mixture was maintained at about 25 degrees centigrade for about sixteen hours. The resulting precipitate, consisting essentially of the sodium enolate of 2-formyl - 11β - hydroxy-21-acetoxy-4,17(20)-pregnadiene-3-one first appeared as a gum but solidified upon standing. To the stirred mixture was then added 500 milliliters of water and the stirring continued until all of the solid had dissolved. The aqueous layer was separated, washed with ether and then acidified with dilute hydrochloric acid. The resulting precipitate was collected by filtration, washed with water and dried. There was thus-obtained 12.14 grams of a mixture consisting essentially of 2 - formyl - 11β - hydroxy-21-acetoxy-4,17(20)-pregnadiene-3-one which melted at 110 to 123 degrees centigrade and which gave a positive deep violet ferric chloride test.

Following the procedure described in Example 3, other 21-esters of 2-formyl-11β,21-dihydroxy-4,17(20)-pregnadiene-3-one are prepared by substituting the corresponding 21-ester of 11β,21-dihydroxy-4,17(20)-pregnadiene-3-one as the starting steroid of the reaction described in Example 3. Examples of 2-formyl-11β-hydroxy-21-acyloxy-4,17(20)-pregnadiene-3-ones thus prepared include those wherein the acyl group is the acyl radical of a lower-aliphatic acid, e.g., formic, propionic, butyric, isobutyric, valeric, isovaleric, trimethylacetic, hexanoic, diethylacetic, triethylacetic, octanoic, etc.

EXAMPLE 4

*2-carboxylation of 11β-hydroxy-21-acetoxy-4,17(20)-pregnadiene-3-one*

Following the procedure described in Example 1, 2-carbomethoxy-11β-hydroxy-21-acetoxy-4,17(20) - pregnadiene-3-one and its sodium enolate is produced by the reaction of 11β - hydroxy-21-acetoxy-4,17(20)-pregnadiene-3-one with diethyl carbonate in the presence of sodium hydride as condensation catalyst. Similarly, substituting ethyl chloroformate is productive of the same product.

Substituting methyl or ethyl trifluoroacetate for the dimethyl oxalate employed in Example 1 is productive of 2 - (trifluoroacetyl)-11β-hydroxy-21-acetoxy-4,17(20) pregnadiene-3-one.

EXAMPLE 5

*2-glyoxalation of 11β,21-dihydroxy-4,17(20)-pregnadiene-3-one*

Following the procedure described in Example 1, but substituting 11β,21-dihydroxy-4,17(20)-pregnadiene-3-one as the starting steroid, there is produced 2-methoxyoxalyl-11β,21-dihydroxy-4,17(20)-pregnadiene-3-one and its sodium enolate.

Similarly, other 2 - lower - alkoxyoxalyl-11β,21-dihydroxy-4,17(20)-pregnadiene-3-ones and their alkali-metal enolates are prepared by the reaction of 11β,21-dihydroxy-4,17(20)-pregnadiene-3-one with the selected lower-alkyl diester of oxalic acid and alkali-metal condensation catalyst, wherein at least one of the alkyl groups of the dialkyl ester of oxalic acid corresponds to the alkyl group of the thus-produced alkoxyoxalyl group. 2-formyl - 11β,21 - dihydroxy - 4,17(20)-pregnadiene-3-one and 2-carbo-lower-alkoxy - 11β,21 - dihydroxy - 4,17(20)-pregnadiene-3-one are prepared by substituting, respectively, a lower-alkyl ester of formic acid and a lower-alkyl ester of carbonic acid for the dimethyl oxalate in the reaction described above.

Other alkali-metal enolates are prepared by the reaction of a solution of the free enol of a 2-lower-alkoxyoxalyl - 11β,21-dihydroxy-4,17(20)-pregnadiene-3-one or 21-ester thereof with a solution of an alkaline alkali-metal compound, e.g., potassium hydroxide, potassium tertiary butoxide, lithium hydroxide, lithium methoxide, etc., or by substituting potassium tertiary butoxide, lithium methoxide or other alkali-metal base condensation catalyst in the reactions described in Examples 1 to 5.

EXAMPLE 6

*2-methyl-2-methoxyoxalyl-11β-hydroxy-21-acetoxy-4,17(20)-pregnadiene-3-one*

A mixture of 4.70 grams of crude 2-methoxyoxalyl-11β-hydroxy-21-acetoxy-4,17(20)-pregnadiene-3-one, obtained according to the method of Example 1, ten grams of anhydrous potassium carbonate, fifteen milliliters of methyl iodide and 100 milliliters of acetone were stirred at about 25 degrees centigrade for forty hours. Water was then added and the mixture extracted thoroughly with methylene chloride. The extract was washed with water, dried and the solvent distilled to leave a glassy residue consisting essentially of 2-methyl-2-methoxyoxalyl-11β-hydroxy-21-acetoxy-4,17(20)-pregnadiene-3-one.

Similarly, other 2 - lower-alkyl-2-alkoxyoxalyl-11β-hydroxy - 21 - acyloxy-4,17(20)-pregnadiene-3-ones are prepared by reacting a 2-alkoxyoxalyl-11β-hydroxy-21-acyloxy-4,17(20)-pregnadiene-3-one with an alkyl halide, e.g., methyl bromide, ethyl bromide, propyl bromide, butyl bromide, amyl bromide, hexyl bromide, heptyl bromide, octyl bromide, etc., to produce the corresponding 2-alkylated product wherein the alkoxy and acyloxy groups correspond to those of the starting 2-alkoxyoxalyl-11β-hydroxy-21-acyloxy-4,17(20)-pregnadiene-3-one and the alkyl group corresponds to that of the alkyl halide, e.g., 2-methyl, ethyl, propyl, butyl, amyl, hexyl, heptyl, octyl, etc., 2-methoxy, ethoxy, propoxy, butoxy, amyoxy, hexyloxy, heptyloxy, octyloxy, etc., and 21-formyloxy, acetoxy, propionyloxy, butyryloxy, valeryloxy, hexanoyloxy, heptanoyloxy, octanoyloxy, etc.

If the starting 2-alkoxyoxalyl steroid to be alkylated is 21-esterified, the reaction product may, depending upon the ease of hydrolysis or alcoholysis of the 21-ester group and the alkylation conditions, produce a reaction product consisting, at least in part, of 2-alkylated steroid having a 21-hydroxy group. Examples of 21-ester groups quite resistant to hydrolysis or alcoholysis are 21-trimethylacetate and 21-triethylacetate. Other 21-esters may, if the alkylation reaction contains methyl or ethyl alcohol, be partially or completely converted to a 21-hydroxy group.

EXAMPLE 7

*2-methyl-2-formyl-11β,21-dihydroxy-4,17(20)-pregnadiene-3-one*

Following the procedure described in Example 6, but substituting the crude 2-formyl-11β-hydroxy-21-acetoxy-4,17(20)-pregnadiene-3-one, obtained according to the method described in Example 3, as starting steroid, there is thus-produced 2-methyl-2-formyl-11β-hydroxy-21-acetoxy-4,17(20)-pregnadiene-3-one.

Substituting other alkylating agents for the methyl iodide employed in the reaction described in Example 7, there is thus-produced the corresponding 2-lower-alkyl-2-formyl - 11β,21 - dihydroxy - 4,17(20) - pregnadiene - 3-ones wherein the lower-alkyl group is, for example, ethyl, propyl, butyl, amyl, hexyl, heptyl, octyl, etc. Similarly, starting with a 2-formyl-11β-hydroxy-21-acyloxy-4,17(20)-pregnadiene-3-one wherein the acyloxy group is, for example, acetoxy, propionyloxy, butyryloxy, valeryloxy, hexanoyloxy, heptanoyloxy, octanoyloxy, or other lower-acyloxy group, or other hydrocarboncarbonyloxy group, there is produced a 2-lower-alkyl-2-formyl-11β,21-dihydroxy-4,17(20)-pregnadiene-3-one wherein the 21-hydroxy group is at least partially, if not completely, still esterified, depending upon the ease of hydrolysis or alcoholysis of the 21-acyloxy group and the alkylation conditions.

EXAMPLE 8

*2-methyl-2-carbomethoxy-11β-hydroxy-21-acetoxy-4,17(20)-pregnadiene-3-one*

Following the procedure described in Example 6, but substituting 2-carbomethoxy-11β-hydroxy-21-acetoxy-4,17(20)-pregnadiene-3-one as the starting steroid, there is thus-produced 2-methyl-2-carbomethoxy-11β-hydroxy-21-acetoxy-4,17(20)-pregnadiene-3-one.

Substituting other lower-alkyl halides as the alkylating agent in the above reaction is productive of other 2-lower-alkyl - 21 - carbomethoxy - 11β - hydroxy - 21 - acetoxy-4,17(20)-pregnadiene-3-ones wherein the lower-alkyl group corresponds to that of the alkylating agent.

Substituting other 2-carbo-lower-alkoxy-11β-hydroxy-21-acetoxy-4,17(20)-pregnadiene-3-ones as the starting steroid, in the reaction described above is productive of the corresponding 2-methyl-2-carbo-lower-alkoxy-11β-hydroxy-21-acetoxy-4,17(20)-pregnadiene-3-ones.

Substituting 2-(trifluoroacetyl)-11β-hydroxy-21-acetoxy-4,17(20)-pregnadiene-3-one as starting steroid in the reaction described in Example 6 is productive of 2-methyl-2 - (trifluoroacetyl) - 11β - hydroxy - 21 - acetoxy - 4,17 (20)-pregnadiene-3-one.

EXAMPLE 9

*2-methyl-11β,21-dihydroxy-4,17(20)-pregnadiene-3-one*

The glassy residue of crude 2-methyl-2-methoxyoxalyl-11β-hydroxy-21-acetoxy-4,17(20)-pregnadiene-3-one, obtained according to the method described in Example 6, was dissolved in fifty milliliters of methanol to which was then added three milliliters of a 25 percent solution of sodium methoxide in methanol. The now red solution was stirred for two hours at about 25 degrees centigrade. The mixture was then diluted with about 200 milliliters of water and extracted thoroughly with methylene chloride. The combined methylene chloride extracts were washed with water, dried and the solvent then distilled therefrom, leaving a steroidal residue consisting essentially of 2-methyl-11β,21-dihydroxy-4,17(20)-pregnadiene-3-one. The thus-produced 2-methyl-11β,21-dihydroxy-4,17(20)-pregnadiene-3-one is purified by chromatography over Florisil synthetic magnesium silicate developed with Skellysolve B hexane hydrocarbons containing increasing amounts of acetone.

Similarly, 2 - methyl - 11β,21 - dihydroxy - 4,17(20)-pregnadiene-3-one is prepared by substituting, as starting steroid for the reaction described above, another 2-methyl-2 - lower - alkoxyoxalyl - 11β - hydroxy -21 - acetoxy-4,17(20)-pregnadiene-3-one, e.g., wherein the lower-alkoxy group is ethoxy, propoxy, butoxy, amyloxy, hexyloxy, heptyloxy, octyloxy, etc., for the 2-methyl-2-methoxyoxalyl - 11β - hydroxy - 21 - acetoxy - 4,17(20) - pregnadiene-3-one employed in Example 9.

Following the procedure described in Example 9, other 2 - lower - alkyl - 11β,21 - dihydroxy - 4,17(20) - pregnadiene-3-ones are prepared wherein the lower-alkyl group is, for example, ethyl, propyl, butyl, amyl, hexyl, heptyl, octyl, etc., by substituting a 2-lower-alkyl-2-lower-alkoxyoxalyl - 11β,21 - dihydroxy - 4,17(20) - pregnadiene-3-one or 21-acyloxy ester thereof wherein the lower-alkoxy group is, for example, methyl, ethyl, propyl, butyl, amyl, hexyl, heptyl, octyl, etc., and the lower-alkyl group corresponds to the desired lower-alkyl group of the reaction product, for the 2-methyl-2-methoxyoxalyl - 11β - hydroxy - 21 - acetoxy - 4,17(20) - pregnadiene-3-one employed as starting steroid in the reaction described in Example 9.

EXAMPLE 10

2-methyl-11β,21-dihydroxy-4,17(20)-pregnadiene-3-one

Following the procedure described in Examples 6 and 9, 2 - formyl - 11β,21 - dihydroxy - 4,17(20) - pregnadiene-3-one was converted in 35 percent yield to 2-methyl-11β,21-dihydroxy-4,17(20)-pregnadiene-3-one.

In the same manner, 2-methyl-11β,21-dihydroxy-4,17(20)-pregnadiene-3-one is prepared by substituting the sodium enolate of 2-formyl-11β,21-dihydroxy-4,17(20)-pregnadiene-3-one, the sodium enolate of 2-ethoxyoxalyl-11β,21-dihydroxy-4,17(20)-pregnadiene-3-one, or another alkali-metal enolate of either of these compounds, as the starting steroid in the reactions described in Examples 6 and 9.

Similarly, substituting a 2-lower-alkyl-2-formyl-11β,21-dihydroxy-4,17(20)-pregnadiene-3-one or 21-lower-acyloxy ester thereof wherein the alkyl group is, for example, methyl, propyl, butyl, amyl, hexyl, heptyl, octyl, etc., as the starting steroid in the reaction described in Example 9, there is produced a 2-lower-alkyl-11β,21-dihydroxy-4,17(20)-pregnadiene-3-one wherein the lower-alkyl group corresponds to that of the starting steroid.

Similarly, 2 - methyl - 11β,21 - dihydroxy - 4,17(20)-pregnadiene-3-one is prepared, according to the method of Example 9, by substituting 2-methyl-2-carbomethoxy-11β - hydroxy - 21 - acetoxy - 4,17(20) - pregnadiene - 3-one or other 2-methyl-2-carbo-lower-alkoxy-11β-hydroxy-21-acyloxy-4,17(20)-pregnadiene-3-one, or 2-methyl-2-(trifluoroacetyl) - 11β - hydroxy - 21 - acyloxy - 4,17(20)-pregnadiene-3-one wherein the acyl group is that of a hydrocarbon carboxylic acid containing from one to twelve carbon atoms, inclusive, as starting steroid in Example 9.

EXAMPLE 11

2-ethyl-11β,21-dihydroxy-4,17(20)-pregnadiene-3-one

Following the procedure described in Example 9, but substituting 2 - ethyl - 2 - methoxyoxalyl - 11β - hydroxy-21-acetoxy-4,17(20)-pregnadiene-3-one as the starting steroid, there is thus-produced 2-ethyl-11β,21-dihydroxy-4,17(20)-pregnadiene-3-one.

EXAMPLE 12

2 - methyl - 11β - hydroxy - 21 - acetoxy - 4,17(20) - pregnadiene-3-one

The crude residue obtained from a reversal reaction performed exactly as described in Example 9 was dissolved in a mixture of ten milliliters of acetic anhydride and ten milliliters of dry pyridine. The mixture was maintained at about 25 degrees centigrade for about sixteen hours. The excess acetic anhydride was then decomposed with ice water and the resulting gummy precipitate was extracted with benzene. The benzene solution was washed with cold dilute hydrochloric acid, cold aqueous sodium bicarbonate and finally with water and then dried. The dried benzene solution was poured over a chromatographic column of 100 grams of Florisil synthetic magnesium silicate. The column was developed with 1350 milliliters of Skellysolve B hexane hydrocarbons containing five percent acetone followed by 750 milliliters of Skellysolve B plus 7.5 percent acetone and then 150 milliliters of acetone. The eluates were collected in 150 milliliter fractions. Eluate fractions 4 to 8 contained a total of 1.71 grams, a yield of 44 percent, calculated on the starting 2-methoxyoxalyl-11β,21-dihydroxy-4,17(20)-pregnadiene-3-one, of crystalline 2-methyl-11β-hydroxy - 21 - acetoxy - 4,17(20) - pregnadiene - 3 - one. Recrystallization of this product gave 2-methyl-11β-hydroxy - 21 - acetoxy - 4,17(20) - pregnadiene - 3 - one melting at 182 to 184.5 degrees centigrade, having an $[\alpha]_D$ of plus 145 degrees in chloroform, an ultraviolet absorption of 15,025 at 242 millimicrons and the analysis below.

Calculated for $C_{24}H_{34}O_4$: C, 74.57; H, 8.87. Found: C, 74.32; H, 8.79.

Similarly, 2 - methyl - 11β,21 - dihydroxy - 4,17(20)-pregnadiene-3-one is converted to other 2-methyl-11β-hydroxy - 21 - acyloxy - 4,17(20) - pregnadiene - 3 - ones by esterification of the 21-hydroxy group, e.g., by reaction with the appropriate acid anhydride, acid chloride or bromide, ester by ester exchange, acid in the presence of an esterification catalyst, etc., 2 - methyl - 11β,21 - dihydroxy - 4,17(20) - pregnadiene - 3 - one is similarly converted to other 21-esters thereof. Examples of 2-methyl - 11β - hydroxy - 21 - acyloxy - 4,17(20) - pregnadiene-3-one prepared include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethyliso-valeric, an acyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2,3 or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts) e.g., succinic, glutaric, α-methylglutaric, β-methylglutaric, β,β-dimethylglutaric, adipic, pimelic, suberic, a hydroxyacid, e.g., glycolic, lactic, citric, tartaric, d-malic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other hetero-substituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-napthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

Alternatively, the 21-hydroxy group of the 2-methyl-11β,21 - dihydroxy - 4,17(20) - pregnadiene - 3 - one can be converted to another 21-derivative, leaving the remainder of the molecule unchanged. Examples of such 21-derivatives are 21-ethers, e.g., 21-methoxy, ethoxy, benzyloxy, propoxy, α-tetrahydropyranyloxy, (β-carbethoxy - β - cyano)ethylenoxy, β,β - dicarbethoxy - ethenyloxy, β - ketocyclohexenyloxy, β - trichloro - α - acetylethoxy, chloromethoxy, dimethylmethoxy, diethylmethoxy, dimethylethoxy, diethylethoxy, 21-thioesters, e.g., acetylmercapto, β - cyclopentylpropionylmercapto, triethylacetylmercapto, trimethylacetylmercapto, propionylmercapto, 21-thione esters, e.g., thioacetyloxy, thiopropionyloxy, thio - β - cyclopentylpropionyloxy, thiotriethylacetyloxy, thiotrimethylacetyloxy, imido derivatives of acetyl esters, e.g., acetimido-oxy, 21-esters of mineral acids, e.g., 21-phosphate, 21-sulfonate, 21-sulfinate, 21-methylphosphate, 21-methylsulfonate, 21-methylsulfinate, 21-bromo, fluoro and 21-chloro, esters of the carbonic acids, e.g., 21-carbonate, 21-(triethoxy)methoxy, 21-sulfonyloxy, e.g., 21-para-toluenesulfonyloxy, etc.

EXAMPLE 13

*2 - ethyl - 11β - hydroxy - 21 - acetoxy - 4,17(20) - pregnadiene-3-one*

Following the procedure described in Examples 6, 9 and 12, but substituting ethyl iodide for the methyl iodide as the alkylating agent, 11β-hydroxy-21-acetoxy-4,17(20)-pregnadiene-3-one was converted to 2-ethyl-11β-hydroxy-21-acetoxy-4,17(20)-pregnadiene-3-one. The reaction product from the acetylation was dissolved in methylene chloride and poured over a column of Florisil synthetic magnesium silicate. The 2-ethyl-11β-hydroxy-21-acetoxy-4,17(20)-pregnadiene-3-one was eluted from the column with Skellysolve B hexane hydrocarbons plus five percent acetone and melted, after crystallization from a mixture of acetone and Skellysolve B, at 149 to 151 degrees centigrade, and had the analysis below.

Calculated for $C_{25}H_{36}O_4$: C, 74.96; H, 9.06. Found: C, 75.23; H, 9.17.

Similarly, other 2-lower-alkyl-11β,21-dihydroxy-4,17(20)-pregnadiene-3-ones are esterified to produce the 2-lower - alkyl - 11β - hydroxy - 21 - acyloxy - 4,17(20)-pregnadiene - 3 - ones wherein the lower-alkyl group is, for example, ethyl, propyl, butyl, amyl, hexyl, heptyl, octyl, etc., and the acyl group is the acyl radical of an acid named in Example 12 or the paragraph following.

EXAMPLE 14

*2-methyl-11β,17α-dihydroxy-21-acetoxy-4-pregnene-3,20-dione*

To a solution of 1.40 grams (3.63 millimoles) of 2-methyl - 11β - hydroxy - 21 - acetoxy - 4,17(20)-pregnadiene-3-one in seventy milliliters of dry tertiary butyl alcohol was added at room temperature nine milliliters of dry pyridine, 5.8 milliliters of dry tertiary butyl alcohol solution containing 1.37 grams (9.1 millimoles) of N-methylmorpholineoxide peroxide, and ten milligrams of osmium tetroxide, in that order. The resulting solution was stirred at between 25 and thirty degrees centigrade for eighteen hours. There was then added 150 milliliters of water to the mixture which was then extracted thoroughly with methylene chloride, the methylene chloride solution washed with water, cold dilute hydrochloric acid, cold aqueous sodium bicarbonate, water and then dried. The solvent was distilled from the dried solution at reduced pressure. The crude residue was dissolved in methylene chloride and poured over a column of 110 grams of Florisil synthetic magnesium silicate. The column was developed with 175 milliliter portions of solvent of the following composition and order: eight of Skellysolve B plus ten percent acetone, seven of Skellysolve B plus twelve percent acetone, two of Skellysolve B plus fifteen percent acetone, and one of acetone. The Skellysolve B plus five percent acetone eluted 331 milligrams of starting steroid. The Skellysolve B plus twelve percent acetone eluted 784 milligrams, a yield of 69 percent calculated on the starting steroid which reacted, of 2-methyl-11β,17α - dihydroxy - 21 - acetoxy - 4 - pregnene - 3,20-dione which, after crystallization from ether, melted at 133 to 135 degrees centigrade, had an $[\alpha]_D$ of plus 158 degrees in chloroform and the analysis is below.

Calculated for $C_{24}H_{34}O_6$: C, 68.87; H, 8.19. Found: C, 68.38; H, 8.52.

Subsequent preparations of 2 - methyl - 11β,17α-dihydroxy - 21 - acetoxy - 4 - pregnene - 3,20 - dione gave crystals melting at 171 to 171.5 when crystallized from a mixture of ethyl acetate and Skellysolve B, having an $[\alpha]_D$ of plus 164 degrees, an $E_{242}$ of 15,125, the same papergram and infrared spectrum analysis as the product of the previous preparation, and a carbon-hydrogen analysis almost identical to the calculated.

Similarly, other 2 - methyl - 11β - hydroxy - 21-acyloxy - 4,17(20) - pregnadiene - 3 - ones are similarly converted to the corresponding 2 - methyl - 11β,17α - dihydroxy - 21 - acyloxy - 4 - pregnene - 3,20 - diones wherein the acyl group is the acyl radical of, for example, a lower-aliphatic acid, e.g., formic, propionic, butyric, isobutyric, valeric, isovaleric, trimethylacetic, 2 - methylbutyric, 3-ethylbutyric, hexanoic, diethylacetic, triethylacetic, heptanoic, octanoic, the optically active abietic, α-ethylisovaleric, an acyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2,3, or 4-methylbenzoic, 2,3-, 2,4-, 2,5-, 2,6-, 3,4- and 3,5 - dimethylbenzoic, ethylbenzoic, 2,4,6 - trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts) e.g., succinic, glutaric, α-methylglutaric, β-methylglutaric, β,β-dimethylglutaric, adipic, pimerlic, suberic, a hydroxyacid, e.g., glycolic, lactic, citric, tartaric, d-maleic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other hetero-substituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-napthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl - 3 - acetic, N - methylmorpholyl - 2 - carboxylic, lysergic, pyrrolyl-2-carboxylic, or other acyl acid.

Alternatively, the starting steroid may be a 2-methyl-11β - hydroxy - 21 - substituted - 4,17(20) - pregnadiene-3 - one wherein the 21-substituent is a 21-ether, e.g., 21-methoxy, ethoxy, benzlyoxy, propoxy, α - tetrahydropyranyloxy, (β-carbethoxy-β-cyano)ethylenoxy, β,β-dicarbethoxyethenyloxy, β - ketocyclohexenyloxy, β - trichloro-α-acetylethoxy, chloromethoxy, dimethylmethoxy, diethylmethoxy, dimethylethoxy, diethylethoxy, 21-thioesters, e.g., acetylmercapto, β-cyclopentylpropionylmercapto, triethylacetylmercapto, trimethylacetylmercapto, propionylmercapto, 21-thione esters, e.g., thioacetyloxy, thiopropionyloxy, thio-β-cyclopentylpropionyloxy, thiotriethylacetyloxy, thiotrimethylacetyloxy, imido derivatives of acetyl esters, e.g., acetimido-oxy, 21-esters of mineral acids, e.g., 21-phosphate, 21-sulfonate, 21-sulfinate, 21-methylphosphate, 21-methylsulfonate, 21-methylsulfinate, 21-bromo, fluoro or 21-chloro, esters of the sulfonyloxy, e.g., 21-para-toluenesulfonyloxy, etc., to produce a 2-methyl-11β,17α-dihydroxy-21-substituted-4-pregnene-3,20-dione wherein the 21-substituent is that of the starting steroid.

EXAMPLE 15

*2-ethyl-11β,17α-dihydroxy-21-acetoxy-4-pregnene-3,20-dione*

Following the procedure described in Example 14, but substituting 2 - ethyl - 11β - hydroxy - 21 - acetoxy - 4,17(20) - pregnadiene - 3 - one as the starting steroid, there is thus produced 2 - ethyl - 11β,17α - dihydroxy - 21-acetoxy - 4 - pregnene - 3,20 - dione. The crude reaction product from the oxidative hydroxylation was dissolved in methylene chloride which was poured over a column of Florisil synthetic magnesium silicate. The column was developed in exactly the manner described in Example 14 and the 2 - ethyl - 11β,17α - dihydroxy - 21 - acetoxy-4 - pregnene - 3,20 - dione, was eluted with Skellysolve B plus ten percent acetone and melted, after crystallization from dilute methanol, at 166 to 169 degrees centrigrade.

Similarly, other 2 - lower - alkyl - 11β - hydroxy - 21-acyloxy - 4,17(20) - pregnadiene - 3 - ones are oxidatively hydroxylated to produce a compound named in Example 14 or the paragraph following wherein the 2-methyl group is replaced by a lower-alkyl group, for example, ethyl, propyl, butyl, amyl, hexyl, heptyl, octyl, etc.

EXAMPLE 16

*2-methyl-11β,17α-dihydroxy-21-acetoxy-4-pregnene-3,20-dione*

To a solution of 1.116 grams (3.0 millimoles) of 2-methyl-11β-hydroxy-21-acetoxy-4,17(20)-pregnadiene-3-one dissolved in sixty milliliters of tertiary butyl alcohol and 1.5 milliliters of pyridine is added, at 25 degrees centigrade, five milliliters of tertiary butyl alcohol containing 11.1 milligrams (0.044 millimole) of osmium tetroxide and 0.2 milliliter (0.11 millimole) of water. To the solution is then added 2.4 grams (7.5 millimoles) of phenyliodosoacetate, which completely dissolves within twenty minutes. When the reaction is substantially complete, twenty milliliters of water is added to the reaction mixture and then distilled at reduced pressure to a volume of about twenty milliliters. An additional twenty milliliters of water is added to the residue and the mixture thoroughly extracted with ethylene dichloride.

The steroidal portion of the extract consists mainly of 2-methyl-11β,17α-dihydroxy-21-acetoxy-4-pregnene-3,20-dione.

EXAMPLE 17

*2-methyl-11β,17α-dihydroxy-21-acetoxy-4-pregnene-3,20-dione*

To a solution of 744 milligrams (2.0 millimoles) of 2-methyl-11β-hydroxy-21-acetoxy-4,17(20)-pregnadiene-3-one in thirty milliliters of tertiary butyl alcohol is added one milliliter of pyridine and 25 milligrams (0.1 millimole) of osmium tetroxide in eight milliliters of tertiary butyl alcohol. To the resulting solution is added 8.36 milliliters (5.0 millimoles) of an 0.6 molar solution of hydrogen peroxide in sodium dried tertiary butyl alcohol over a period of one hour and the mixture stirred for another hour.

The reaction mixture thus obtained is worked up as follows: 600 milligrams of sodium sulfite dissolved in 25 milliliters of water is added and, after stirring for five minutes, the resulting mixture is concentrated to about fifteen milliliters by distillation at a pressure of about fifty milliliters mercury absolute and the resulting concentrate then extracted with methylene chloride. The methylene chloride extract is dried. The steroidal product consists mainly of 2-methyl-11β,17α-dihydroxy-21-acetoxy-4-pregnene-3,20-dione. The glycol by-product is 2-methyl-11β,17α,20-trihydroxy-21-acetoxy-4-pregnene-3-one.

The Δ¹ steroids otherwise corresponding to the compounds of Examples 14 to 17, especially 2-methyl-11β,17α,21-trihydroxy-1,4-pregnadiene-3,20-dione and 2-methyl-11β,17α-dihydroxy-21-acetoxy-1,4-pregnadiene-3,20-dione, possess marked adrenal cortical hormone activity useful in the treatment of Addison's disease, rheumatoid arthritis, and inflammatory conditions of the skin, inner ear, nose and eye, of a wide variety. The preparation of a 2-lower-alkyl-11β,17α-dihydroxy-21-acyloxy-1,4-pregnadiene-3,20-dione and the corresponding free 21-hydroxy compound, is given below, as exemplified for the preparation of the 2-methyl compound.

Dehydrogenation of 2-methyl-11β,21-dehydroxy-4,17(20)-pregnadiene-3-one with a fusarium [Experientia, 9, 371–372 (1953)] is productive of 2-methyl-11β,21-dihydroxy-1,4,17(20)-pregnatriene-3-one. Substitution of this compound in the reaction described in Example 12, followed by the reaction of Example 14, is productive of 2-methyl-11β,17α-dihydroxy-21-acetoxy-1,4-pregnadiene-3-one, which can be hydrolyzed to the free 21-hydroxy compound according to methods known in the art, and then reesterified to another 21-ester thereof, e.g., a Δ¹ compound otherwise corresponding to the compounds named in the paragraph following Example 14.

Alternatively, 2-methyl-11β,17α,21-trihydroxy-1,4-pregnadiene-3-one and 21-esters thereof are prepared by the following sequence of reactions: hydrogenating 2-methyl-11β,17α-dihydroxy-21-acetoxy-4-pregnene-3,20-dione to produce 2-methyl-11β,17α-dihydroxy-21-acetoxyallopregnane-3,20-dione; dibrominating this compound in glacial acetic acid containing some pyridine to produce 2-methyl-2,4-dibromo-11β,17α-dihydroxy-21-acetoxy-pregnane-3,20-dione and then dehydrobrominating this compound with pyridine, collidine, or semicarbazide followed by the decomposition of the semicarbazone according to methods known in the art, to produce 2-methyl-11β,17α-dihydroxy-21-acetoxy-1,4-pregnadiene-3,20-dione which can be hydrolyzed according to methods known in the art to produce 2-methyl-11β,17α,21-trihydroxy-1,4-pregnadiene-3,20-dione which, in turn, can be reesterified in the manner described hereinbefore to produce a Δ¹ compound otherwise corresponding to the compounds described in the paragraph following Example 14.

Treatment of a 2-lower-alkyl-11β,17α-dihydroxy-21-acetoxy-1,4-pregnadiene-3,20-dione, preferably 2-methyl, with a dehydrating agent, e.g., para-toluenesulfonic acid, POCl₃ in pyridine, HCl in acetic acid, acetic or formic acid in the presence of BF₃, is productive of the corresponding 2-lower-alkyl-17α-hydroxy-21-acetoxy-1,4,9(11)-pregnatriene-3,20-dione which, when reacted with N-bromoacetamide in the presence of aqueous perchloric acid, is converted to the corresponding 2-lower-alkyl-9α-bromo-11β,17α-dihydroxy-21-acetoxy-1,4-pregnadiene-3,20-dione. Reaction of this compound with sodium methoxide and methanol converts the 9α-bromo-11β-hydroxy function to a 9:11-β-oxido group. Treatment of the thus-produced 2-lower-alkyl-9:11-β-oxido-17α-hydroxy-21-acetoxy-1,4-pregnadiene-3,20-dione with anhydrous hydrogen fluoride in methylene chloride at minus fifteen degrees centigrade is productive of 2-lower-alkyl-9α-fluoro-11β,17α-dihydroxy-21-acetoxy-1,4-pregnadiene-3,20-dione, preferably the 2-methyl compound. Hydrolysis of this compound with aqueous sodium bicarbonate in methanol under nitrogen at room temperature is productive of the 2-lower-alkyl-9α-fluoro-11β,17α,21-trihydroxy-1,4-pregnadiene-3,20-dione which can be reesterified according to one of the methods described in the paragraph following Example 14 to produce a Δ¹-9α-fluoro compound otherwise corresponding to the esters described in the paragraph following Example 14. The corresponding 9α-chloro compounds are produced by substituting hydrogen chloride for the hydrogen fluoride employed in the reaction described above. These 9α-fluoro and 9α-chloro compounds possess a high order of mineralocorticoid, glucocorticoid, and anti-inflammatory activity.

The 19-normethyl analogoues of the novel synthetic 2-lower-alkyl steroids of the present invention possessing the cortical hormone side chain, also possess pronounced anti-inflammatory and other adrenal cortical hormone activity. These compounds, i.e., 2-lower-alkyl-11β,17α,21-trihydroxy-19-normethyl-4-pregnene-3,20-dione, 2-lower-alkyl-9α-fluoro-11β,17α,21-trihydroxy-19-normethyl-4-pregnene-3,20-dione, 2-lower-alkyl-9α-chloro-11β,17α,21-trihydroxy-19-normethyl-4-pregnene-3,20-dione, and 21-esters thereof, e.g., lower-aliphatic and preferably acetate, wherein the 2-lower-alkyl group is preferably methyl, are prepared instead of the corresponding 19-methyl compounds, by substituting the corresponding 2-lower-alkyl-19-normethyl-11β,21-dihydroxy-4-pregnene,3,20-dione for the 2-lower-alkyl-11β,21-dihydroxy-4-pregnene-3,20-dione as starting steroid in the production of a 2-lower-alkyl-11β,17α-dihydroxy-21-acyloxy-4-pregnene-3,20-dione. The thus-produced 2-lower-alkyl-11β,17α-dihydroxy-19-normethyl-21-acyloxy-4-pregnene-3,20-dione can then be converted to the other 19-normethyl compounds described above in the same manner that the corresponding 19-methyl compounds are prepared.

The starting 2 - lower - alkyl - 11β,21 - dihydroxy-19-normethyl-3-one is prepared by converting 19-normethyl-progesterone to 11β,21-dihydroxy-19-normethyl-4,17(20)-pregnadiene-3-one according to the method described in U.S. Patent 2,790,814.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2-carbonyl - 2 - lower-alkyl - 11β - hydroxy-21-oxy-4,17(20)-pregnadiene-3-one represented by the following formula:

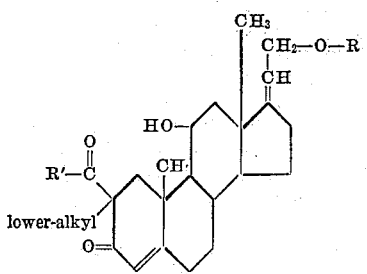

wherein R is selected from the group consisting of hydrogen and the acyl radical of a hydrocarbon carboxylic acid containing from one to twelve carbon atoms, inclusive, and wherein R' is selected from the group consisting of hydrogen, trifluoromethyl, lower-alkoxy and carbo-lower-alkoxy.

2. 2 - lower - alkoxyoxalyl - 2 - methyl - 11β,21 - dihydroxy-4,17(20)-pregnadiene-3-one represented by the following formula:

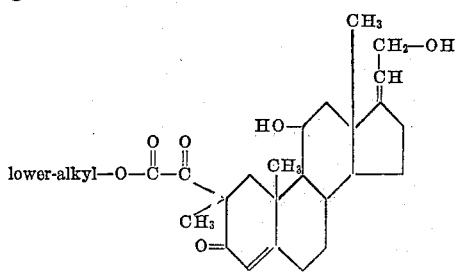

3. 2 - lower - alkoxyoxalyl - 2 - methyl - 11β-hydroxy-21-acyloxy-4,17(20)-pregnadiene-3-one represented by the following formula:

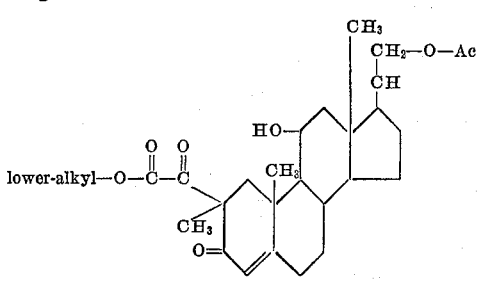

wherein Ac is the acyl radical of a hydrocarbon carboxylic acid containing from one to twelve carbon atoms, inclusive.

4. A compound of claim 3 wherein Ac is acetyl.

5. 2 - methyl - 2 - methoxyoxalyl - 11β - hydroxy - 21-acetoxy-4,17(20)-pregnadiene-3-one.

6. 2 - methyl - 2 - methoxyoxalyl - 11β,21 - dihydroxy-4,17(20)-pregnadiene-3-one.

7. The process which comprises alkylating the alkali-metal salt of a 2-carbonyl-11β-hydroxy-21-oxy-4,17(20)-pregnadiene-3-one represented by the following formula:

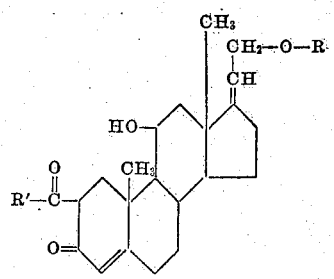

wherein R is selected from the group consisting of hydrogen and the acyl radical of a hydrocarbon carboxylic acid containing from one to twelve carbon atoms, inclusive, and R' is selected from the group consisting of hydrogen, trifluoro-methyl, lower-alkoxy, and carbo-lower-alkoxy, with a lower-alkyl halide wherein the halogen has an atomic weight from 79 to 127, inclusive, to produce a 2 - lower - alkyl - 2 - carbonyl - 11β - hydroxy - 21 - oxy-4,17(20)-pregnadiene-3-one.

8. The process of claim 7 wherein R is hydrogen, R' is carbo-methoxy and the lower-alkyl halide is methyl iodide.

9. The process which comprises the steps of (1) alkylating the alkali-metal salt of a 2-carbonyl-11β-hydroxy-21-oxy-4,17(20)-pregnadiene-3-one represented by the following formula:

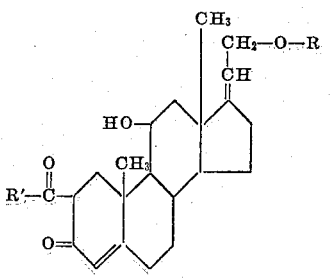

wherein R is selected from the group consisting of hydrogen and the acyl radical of a hydrocarbon carboxylic acid containing from one to twelve carbon atoms, inclusive, and R' is selected from the group consisting of hydrogen, trifluoromethyl, lower-alkoxy, and carbo-lower-alkoxy, with a lower-alkyl halide wherein the halogen has an atomic weight from 35 to 127, inclusive, to produce a 2-carbonyl-2 - lower-alkyl-11β-hydroxy-21-oxy-4,17(20)-pregnadiene-3-one and (2) removing the 2-carbonyl group of the latter thus-produced compound with an alkali-metal base and a compound selected from the group consisting of water and a lower-alkanol to produce a 2-lower-alkyl-11β-hydroxy-21-oxy-4,17(20)-pregnadiene-3-one.

10. The process of claim 9 wherein R is acetyl, R' is ethoxy-oxalyl and the compound of step 2 is an alkanol containing less than three carbon atoms.

11. The process of claim 9 wherein R is hydrogen, R' is methoxyoxalyl, the lower-alkyl halide is methyl iodide and in step 2 the alkali-metal base is an alkali-metal methoxide and the compound is methanol.

12. The process which comprises the steps of (1) alkylating the alkali-metal salt of a 2-carbonyl-11β-hydroxy-21-oxy-4,17(20)-pregnadiene-3-one represented by the following formula:

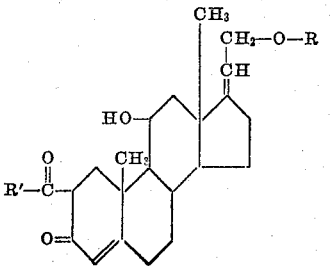

wherein R is selected from the group consisting of hydrogen and the acyl radical of a hydrocarbon carboxylic acid containing from one to twelve carbon atoms, inclusive, and R' is selected from the group consisting of hydrogen, trifluoromethyl, lower-alkoxy, and carbo-lower-alkoxy, with a lower-alkyl halide wherein the halogen has an atomic weight from 79 to 127, inclusive, to produce a 2 - carbonyl - 2 - lower - alkyl - 11β - hydroxy - 21 - oxy - 4,17(20) - pregnadiene - 3 - one; (2) removing the 2-carbonyl group of the latter thus-produced compound with an alkali-metal base and a compound selected from the group consisting of water and a lower-alkanol to produce a 2-lower-alkyl-11β-hydroxy-21-oxy-4,17(20)-pregnadiene-3-one; and (3) esterifying the 2 - lower - alkyl - 11β,21 - dihydroxy - 4,17(20) - pregnadiene - 3 - one with an acylating agent to produce a 2 - lower - alkyl - 11β - hydroxy - 21 - acyloxy - 4,17(20) - pregnadiene - 3 - one.

13. The process of claim 12 wherein R is acetyl, R' is ethoxyoxalyl, the lower-alkyl halide is a methyl halide, the compound of step 2 is an alkanol containing less than three carbon atoms, and the acylating agent of step 3 is an acetylating agent.

14. The process of claim 12 wherein R is acetyl, R' is methoxyoxalyl, the lower-alkyl halide is methyl iodide, in step 2 the alkali-metal base is an alkali-metal methoxide and the compound is methanol, and the acylating agent of step 3 is acetic anhydride.

15. The process of claim 12 wherein R is hydrogen, R' is methoxyoxalyl, the lower-alkyl halide is methyl iodide, in step 2 the alkali-metal base is an alkali-metal methoxide, and the compound is methanol, and the acylating agent of step 3 is acetic anhydride.

16. A compound represented by the following formula:

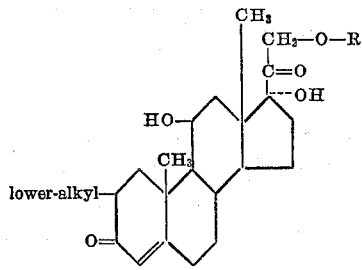

wherein R is selected from the group consisting of hydrogen and the acyl radical of a hydrocarbon carboxylic acid containing from one to eight carbon atoms, inclusive.

17. 2 - methyl - 11β,17α - dihydroxy - 21 - acetoxy - 4 - pregnene - 3,20 - dione.

18. 2 - ethyl - 11β,17α - dihydroxy - 21 - acetoxy - 4 - pregnene - 3,20 - dione.

19. The process which comprises the steps of (1) alkylating the alkali-metal salt of a 2-carbonyl-11β-hydroxy-21-oxy-4,17(20)-pregnadiene-3-one represented by the following formula:

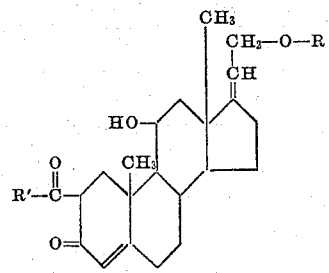

wherein R is selected from the group consisting of hydrogen and the acyl radical of a hydrocarbon carboxylic acid containing from one to twelve carbon atoms, inclusive, and R' is selected from the group consisting of hydrogen, trifluoromethyl, lower-alkoxy, and carbo-lower-alkoxy, with a lower-alkyl halide wherein the halogen has an atomic weight from 79 to 127, inclusive, to produce a 2 - carbonyl - 2 - lower - alkyl - 11β - hydroxy - 21 - oxy - 4,17(20) - pregnadiene - 3 - one; (2) removing the 2-carbonyl group of the latter thus-produced compound with an alkali-metal base and a compound selected from the group consisting of water and a lower-alkanol to produce a 2-lower-alkyl-11β-hydroxy-21-oxy-4,17(20)-pregnadiene-3-one; (3) esterifying the 2-lower-alkyl-11β,21-dihydroxy-4,17(20)-pregnadiene-3-one with an acylating agent to produce a 2-lower-alkyl-11β-hydroxy-21-acyloxy-4,17(20)-pregnadiene-3-one; and (4) oxidative hydroxylating the 21-acyloxy compound with osmium tetroxide and an oxidizing agent to produce a 2-lower-alkyl-11β,17α-dihydroxy-21-acyloxy-4-pregnene-3,20-dione.

20. A compound represented by the formula:

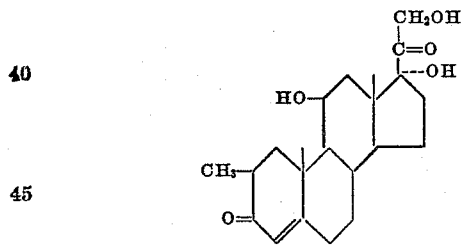

References Cited in the file of this patent
UNITED STATES PATENTS

| | | |
|---|---|---|
| 2,730,537 | Nathan | Jan. 10, 1956 |
| 2,774,776 | Hogg et al. | Dec. 18, 1956 |